(12) United States Patent
Muraoka

(10) Patent No.: US 6,538,644 B1
(45) Date of Patent: Mar. 25, 2003

(54) TOUCH PANEL

(75) Inventor: Tooru Muraoka, Tokyo (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 46 days.

(21) Appl. No.: 09/657,608

(22) Filed: Sep. 8, 2000

(30) Foreign Application Priority Data

Nov. 19, 1999 (JP) .......................................... 11-329922

(51) Int. Cl.[7] .................................................. G09G 5/00
(52) U.S. Cl. ........................ 345/175; 345/173; 345/176; 345/156
(58) Field of Search ................................ 345/175, 176, 345/177, 173, 18, 19; 359/109, 154, 158; 341/22, 31

(56) References Cited

U.S. PATENT DOCUMENTS

| | | | | |
|---|---|---|---|---|
| 3,943,369 A | * | 3/1976 | Saeva | 250/568 |
| 4,517,559 A | * | 5/1985 | Deitch et al. | 345/175 |
| 4,672,558 A | * | 6/1987 | Beckes et al. | 364/518 |
| 4,710,759 A | * | 12/1987 | Fitzgibbon | 345/175 |
| 4,710,760 A | * | 12/1987 | Kasday | 345/175 |
| 4,905,174 A | * | 2/1990 | Ouchi | 345/175 |
| 5,295,009 A | * | 3/1994 | Barnik et al. | 349/115 |
| 5,680,185 A | * | 10/1997 | Kobayashi et al. | 349/88 |
| 5,815,598 A | * | 9/1998 | Hara et al. | 349/25 |
| 5,822,445 A | * | 10/1998 | Wong | 328/127 |
| 5,835,458 A | * | 11/1998 | Bischel et al. | 369/44.28 |
| 6,191,410 B1 | * | 2/2001 | Johnson | 350/208.1 |
| 6,259,831 B1 | * | 7/2001 | Faris et al. | 358/8 |
| 6,456,279 B1 | * | 9/2002 | Kubo et al. | 345/173 |

* cited by examiner

Primary Examiner—Dennis-Doon Chow
Assistant Examiner—Alecia D. Nelson
(74) Attorney, Agent, or Firm—Staas & Halsey LLP

(57) ABSTRACT

A simply constituted touch panel featuring a high transparency and a high sensitivity. A transverse source of light 112 is arranged along one transverse side wall of a polymer sheet 10 of the shape of a flat plate via a film 111 for polarizing light from the transverse light source, and a longitudinal source of light 122 is arranged along a longitudinal side surface thereof via a film 121 for polarizing light from the longitudinal light source. A transverse light sensor array 114 is arranged along the other transverse side surface via a film 113 for polarizing transversely transmitted light, and a longitudinal light sensor array 24 is arranged along the other longitudinal side surface via a film 123 for polarizing vertically transmitted light. Light emitted from the light source and is incident on the sheet via the film for polarizing light from the light source, passes through the sheet and falls on the light sensor array through the film for polarizing transmitted light. When the sheet is depressed, the direction of polarization of part of the light is turned by 90 degrees due to double refraction. When the polarizing films have the same polarizing directions, therefore, the position where light of a decreased quantity is detected is determined to be a depression position.

36 Claims, 9 Drawing Sheets

TOUCH PANEL

BACKGROUND OF THE INVENTION

1. Field of the Invention

The present invention relates to a touch panel which is one kind of pointing device and, particularly, to a touch panel utilizing photoelasticity.

2. Prior Art

A touch panel is used as a pointing device for specifying a position on a display unit of a personal computer.

Touch panels of the resistance film type, electrostatic capacity type and optical type have already been put into practical use.

The touch panel of the resistance film type has a constitution in which two pieces of resistance film are arranged opposed to each other while maintaining a suitable gap, and a voltage is applied to one of the resistance films. This touch panel detects a depressed position by utilizing the fact that a voltage detected when the two pieces of resistance films come in contact varies depending upon the depressed position.

The touch panel of the electrostatic capacity type has a structure in which a pair of electrodes are arranged opposed to each other while maintaining a suitable gap, and a voltage is applied across the electrodes. This touch panel detects a depressed position by utilizing the fact that the electrostatic capacity across the electrodes varies depending upon the depressed position.

Various types of optical touch panels have been proposed. For example, a touch panel can have a structure in which the upper surface of the touch panel is scanned by two laser beams, and a depressed position is detected by detecting the angle of emission of the laser beam interrupted by the depressed position.

In the touch panel of the resistance film type, however, the resistance film has a transparency as low as 80 to 90%. When arranged on the surface of the display, therefore, a deterioration in the brightness of the display is not avoidable.

In the touch panel of the electrostatic capacity type, on the other hand, the detection sensitivity must be set to be low to prevent erroneous operation.

Further, the optical touch panel is affected by obstacles such as dust on the touch panel and its constitution is complex.

SUMMARY OF THE INVENTION

The present invention was accomplished in view of the above-mentioned circumstances, and has an object of providing a simply constituted touch panel which maintains a high transparency and a high sensitivity.

The touch panel according to a first invention comprises:

a homogeneous polymer sheet in the shape of a flat plate;

light sources arranged along two neighboring side walls of the polymer sheet;

transmitted light polarizing means arranged along the other side walls of the polymer sheet opposite the two side walls along which the light sources are arranged, to polarize light emitted from the light sources and passed through the polymer sheet;

transmitted light detecting means for detecting light polarized by the transmitted light polarizing means; and depressed position specifying means for specifying the depressed position of the polymer sheet based upon the result detected by the transmitted light detecting means.

In the present invention, the angle of the polarized light incident through the polarizing sheet on the side wall of the polymer sheet is changed by the double-refraction when the polymer sheet is depressed, and the quantity of the light passing though another polarizing sheet on another side of the polymer sheet. By detecting a change of the transmitted light, it becomes possible to detect the depressed position.

The touch panel according to a second invention further has means for polarizing light from the light sources, that are arranged between the light sources and the polymer sheet to polarize light emitted from the light sources.

In the present invention, the angle of the polarized light incident through the polarizing sheet of the side surface of the polymer sheet is changed by the double-refraction when the polymer sheet is depressed. By further polarized light passing through the another polarizing sheet of the another side of the polymer sheet, it becomes possible to detect the depressed position by relying upon a change in the transmitted light.

DESCRIPTION OF THE PREFERRED EMBODIMENTS

Figure 1:
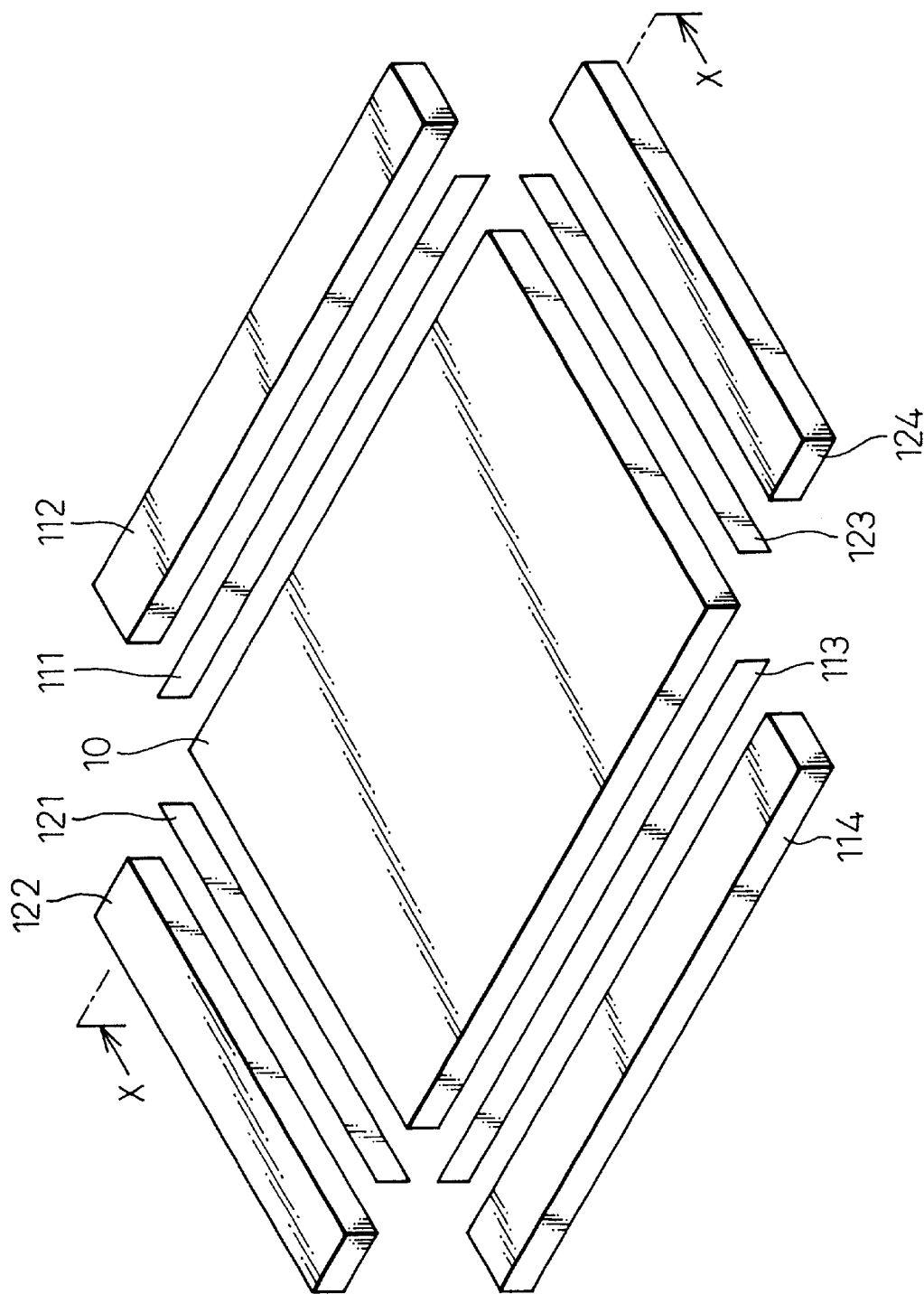
FIG. 1 is a perspective view of a touch panel according to a first embodiment of the present invention.
Figure 2:
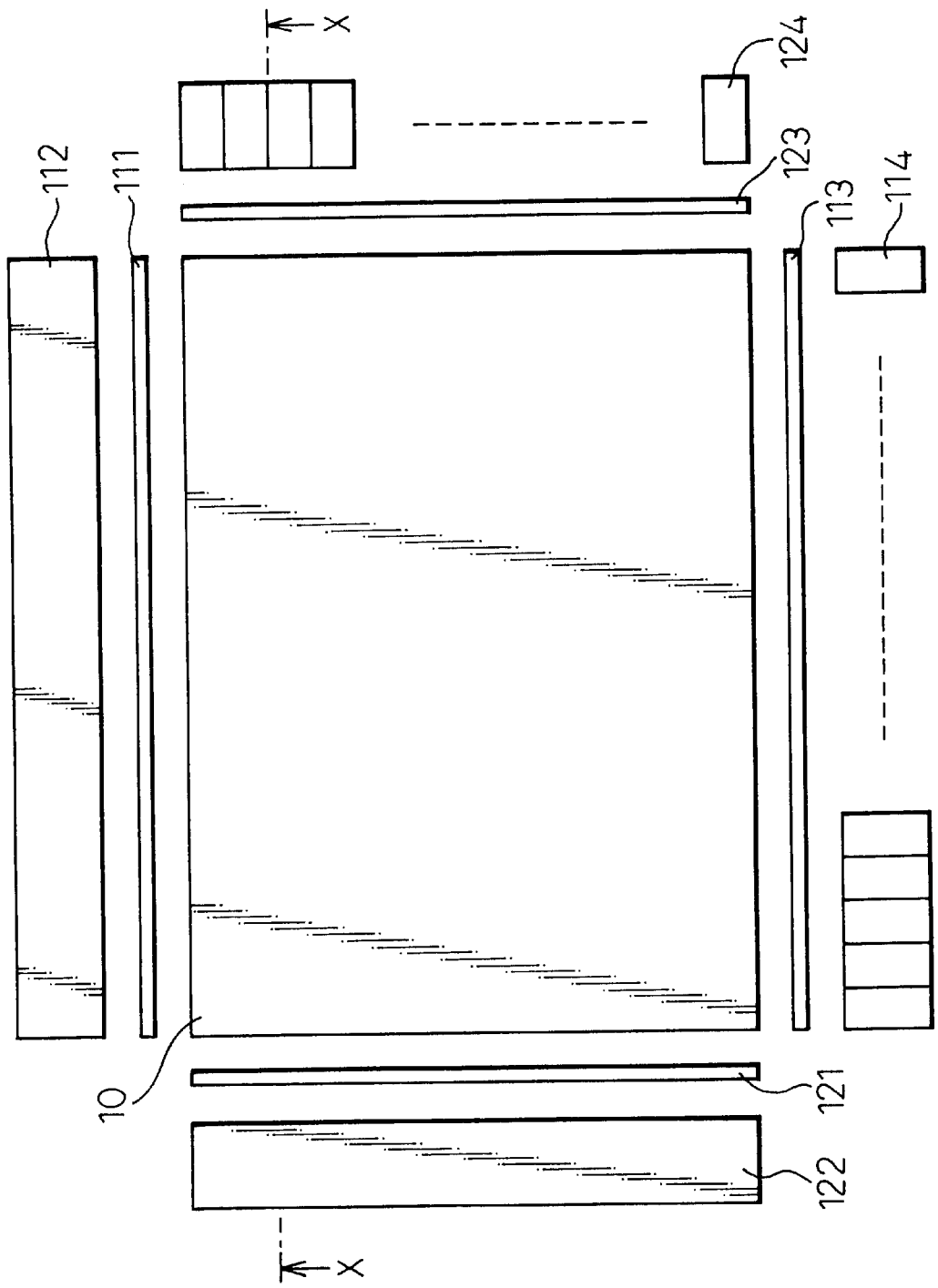
FIG. 2 is a top view of the touch panel according to the first embodiment of the present invention.
Figure 3:
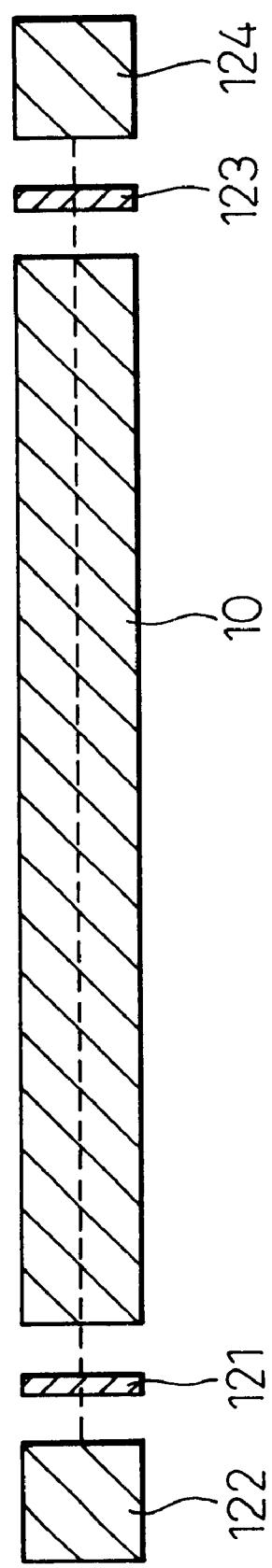
FIG. 3 is an X—X sectional view of the touch panel according to the first embodiment of the present invention.

FIGS. 1, 2 and 3 are a perspective view, a top view and an X—X sectional view of the present invention. A film 111 for polarizing light from a transverse light source is arranged close to one side wall in the transverse direction of a sheet 10 of a homogeneous polymer (e.g., PET) of a nearly rectangular shape, and a transverse light source 112 is arranged along the side wall thereof. Further, a film 113 for polarizing transmitted light in the transverse direction is arranged close to the side wall of the sheet 10 opposite another side wall along which the transverse light source 112 is arranged. Further, a transverse light sensor array 114 is arranged along the side wall.

Further, a film 121 for polarizing light from a longitudinal light source is arranged close to one side wall in the longitudinal direction of the polymer sheet 10, and a longitudinal light source 122 is arranged along the side wall thereof. Further, a film 123 for polarizing transmitted light in the longitudinal direction is disposed close to the side surface of the sheet 10 on the side opposite to the side wall thereof along which the longitudinal light source 122 is arranged. Further, a longitudinal light sensor array 124 is arranged along the side wall thereof.

To clearly illustrate the constitution, FIG. 1 shows the polarizing films 111, 113, 121 and 123 in a separated state. In practice, however, the sheet 10 and polarizing films 111, 113, 121 and 123 are intimately adhered together.

Figure 4:
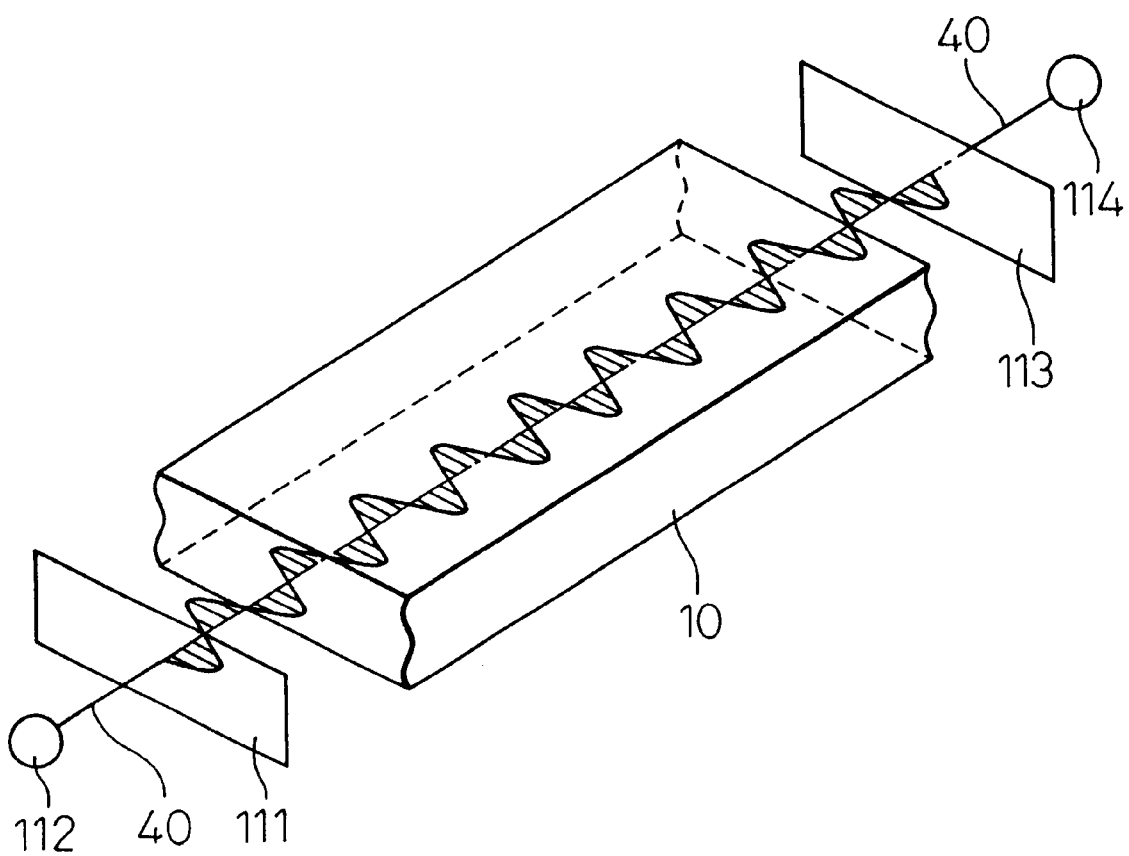
FIG. 4 is a diagram of principle (No. 1) of the touch panel according to the present invention.
Figure 5:
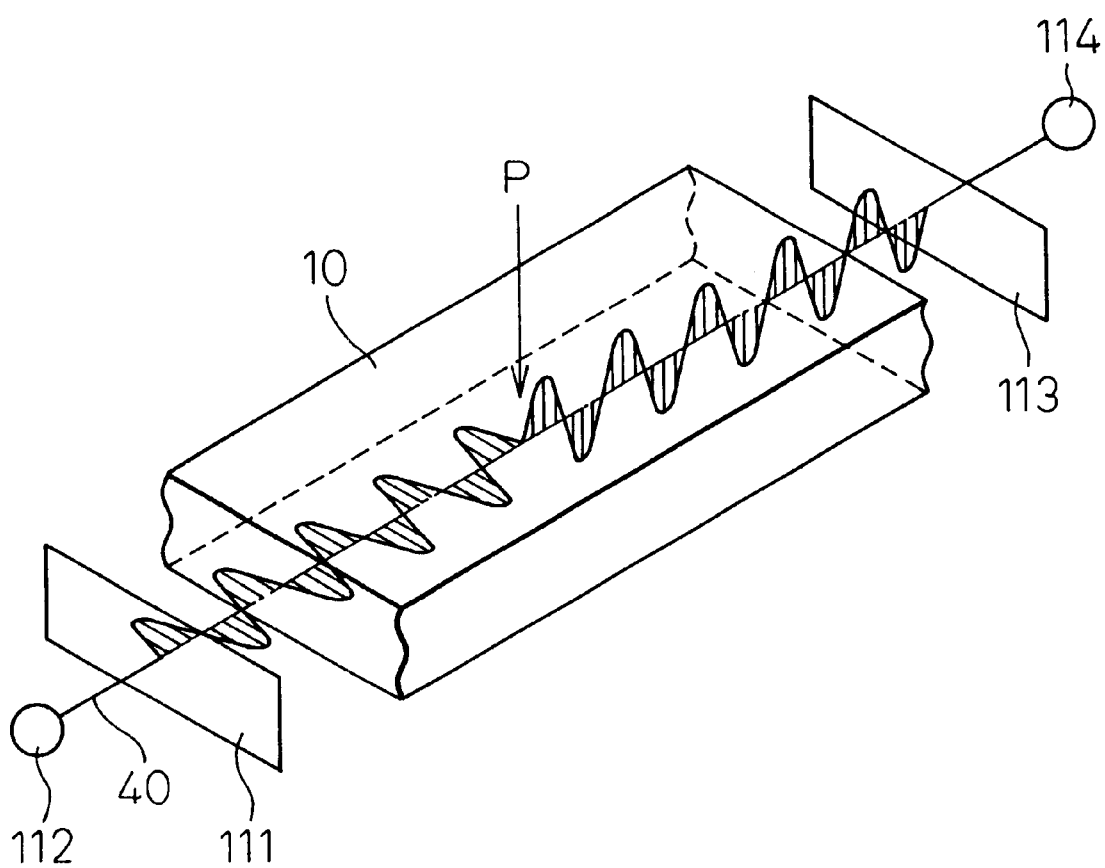
FIG. 5 is a diagram of principle (No. 2) of the touch panel according to the present invention.

FIGS. 4 and 5 are views explaining the principles of the touch panel according to the present invention. Only transverse light waves along an optical axis 40 are shown.

That is, the transverse light source 112, film 111 for polarizing light emitted from the transverse light source 112 in the transverse direction, polymer sheet 10, film 113 for polarizing light that has passed through the polymer sheet 10 in the transverse direction, and transverse light sensor array 114, are arranged in line along the optical axis 40.

In this constitution, only the transverse waves are permitted to fall on the polymer sheet due to the film 111 that polarizes, in the transverse direction, light from the transverse light source 112.

In a state where the polymer sheet 10 is not depressed (FIG. 4), the transverse waves pass through the polymer sheet 10 and arrive at the film 113 that polarizes light in the transverse direction. The film 113 for polarizing light in the transverse direction permits the only transverse waves to pass through, whereby the transverse waves arrive at the transverse light sensor array 114 which then produces a signal corresponding to the presence of the transmitted light.

In a state where the polymer sheet 10 is depressed at a point P (FIG. 5), double refraction occurs at the depressed position and the transverse waves are partly converted into longitudinal waves. The longitudinal waves are blocked by the film 113 that polarizes the transmitted light in the transverse direction. Therefore, no light reaches the transverse light sensor array 114. The transverse light sensor array 114 therefore produces a signal corresponding to a reduction in the transmitted light.

If a transverse (longitudinal) polarizing film is used as the film 111 for polarizing the light from the light source in the transverse direction, and the longitudinal (transverse) polarizing film is used as the film 113 for polarizing the transmitted light in the transverse direction, then, the transverse light sensor array 114 produces a signal corresponding to the absence of the transmitted light when the polymer sheet 10 has not been depressed, and produces a signal corresponding to the presence of the transmitted light when the polymer sheet 10 is depressed.

That is, according to the first embodiment, the film for polarizing light from the light source and the film for polarizing the transmitted light, may polarize the light in the same direction or may polarize the light at right angles with each other.

By employing the film which polarizes the transmitted light in the transverse direction, it is possible to exclude the effect of external light. This is because, light falling on the polymer sheet 10 from the external side works as disturbance for the touch panel of the invention. However, the angle of incidence of light falling on the polymer sheet 10 from the external side is close to 90 degrees, and most of incident beam is longitudinally polarized light. Therefore, the film that polarizes the transmitted light in the transverse direction makes it possible to prevent light from the external side from falling on the light sensor array.

It is further possible to omit films 113 and 123 for polarizing light from the sources of light. In this case, the transmitted light changes little and, hence, the light sensor arrays 114 and 124 lose resolutions to some extent.

As the transverse light source 112 and the longitudinal light source 122 any type which is capable of emitting light onto the whole side walls of the polymer sheet 10 can be used. It is, however, desired to use light sources such as fluorescent lamps. It is further allowable to use a laser as the light source. Further, mirrors may be used to let natural light fall on the side walls of the polymer sheet 10.

As the transverse light sensor array 114 and the longitudinal sensor array 124, any type which is capable of one-dimensionally detecting light with a required resolution can be used, and it is desired to use semiconductor light sensors such as LED arrays or CCD arrays.

It is also allowable to use at least one point light source as the transverse light source 112 or the longitudinal light source 122. In this case, it becomes necessary to install, for example, slit glasses as scattering means for scattering light from the light sources between the transverse light source 112 and the film 111 for polarizing light from the light source in the transverse direction, and between the longitudinal light source 122 and the film 121 for polarizing light from the light source in the longitudinal direction. It further becomes necessary to arrange grids between the transverse light sensor array 114 and the film 113 for polarizing transmitted light in the transverse direction, and between the vertical light sensor array 124 and the film 123 for polarizing transmitted light in the longitudinal direction, in order to prevent light from falling on the transverse light sensor array 114 and on the longitudinal light sensor array 124 except light traveling straight through the polymer sheet 10 in parallel with the side walls of the sheet.

As will be obvious from the foregoing description, it becomes possible to determine the depressed position of the touch panel by processing the outputs of the transverse light sensor array 114 and of the longitudinal light sensor array 124.

Figure 6:
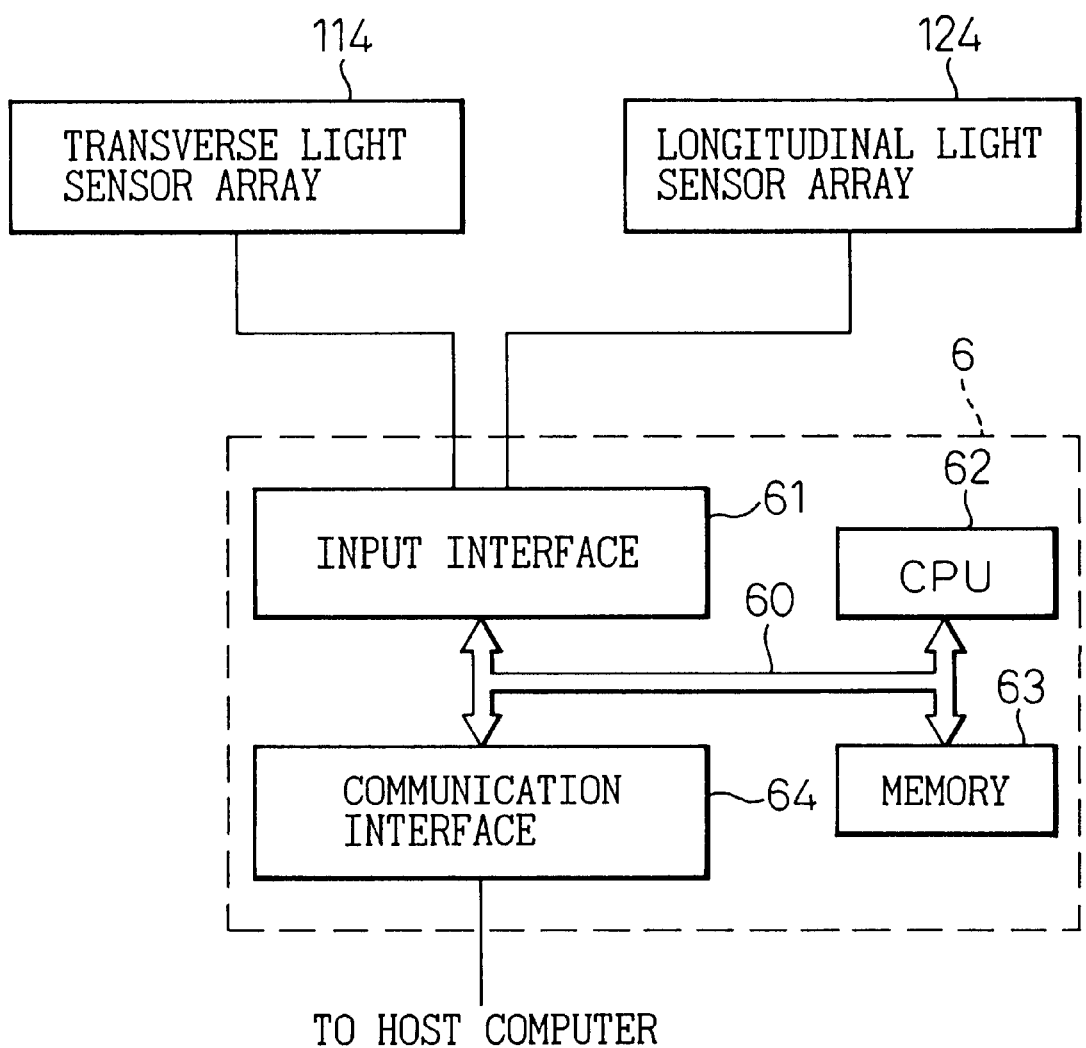
FIG. 6 is a diagram illustrating a depressed position-determining unit according to the embodiment.

FIG. 6 illustrates a depressing position-determining unit according to the first embodiment, wherein the transverse light sensor array 114 and the longitudinal light sensor array 124 are connected to an input interface 61 of a microcomputer system 6.

The microcomputer system 6 is constituted of an input interface 61, a CPU 62, a memory 63, a communication interface 64 and a bus 60, and is connected to a host computer (not shown) through the communication interface 64.

Figure 7:
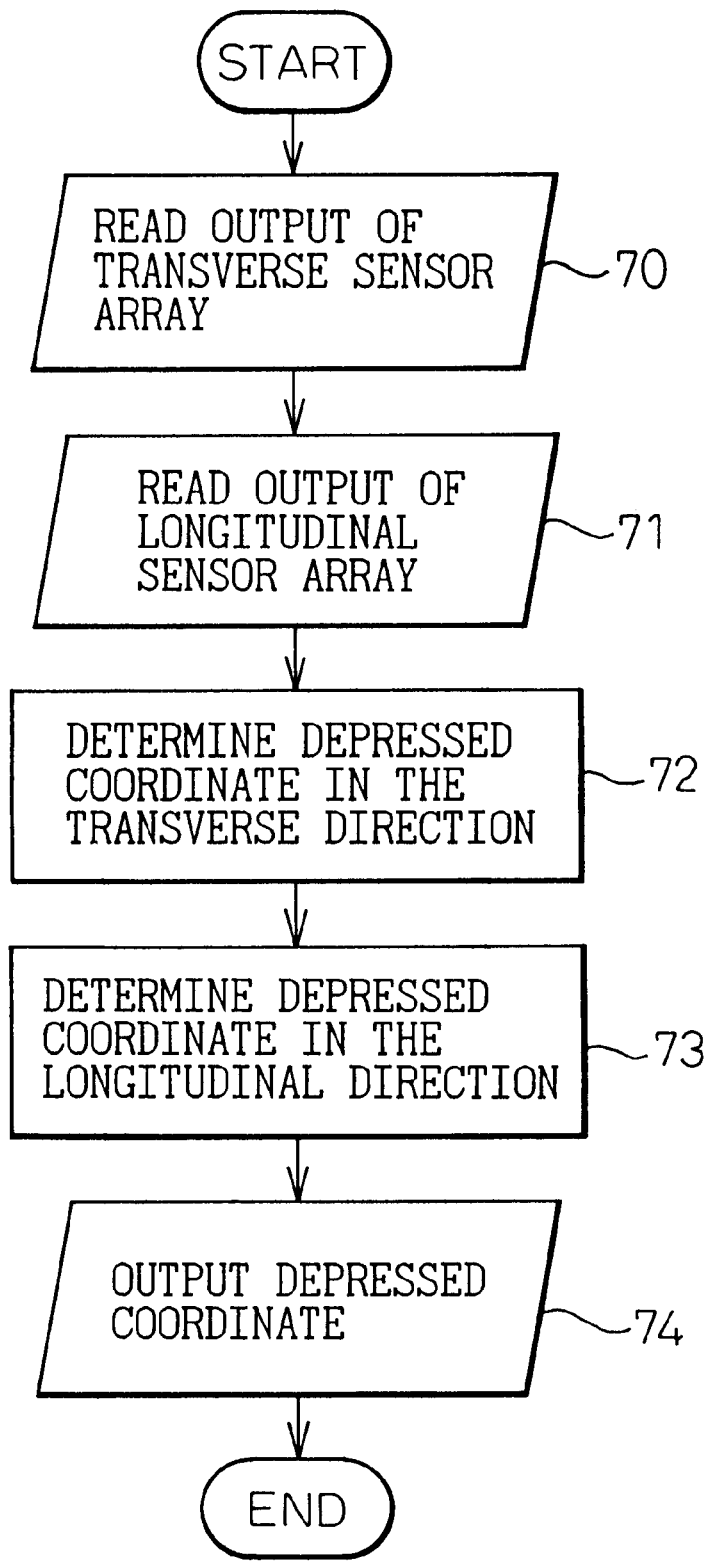
FIG. 7 is a flowchart of a depressed position-determining routine.

FIG. 7 is a flowchart of a depressed position-determining routine executed by the depressed position-determining unit, and is executed as an interrupt processing every predetermined period.

An output of the transverse light sensor array 114 is read at step 70, and an output of the longitudinal light sensor array 124 is read at step 71.

At step 72, a depression coordinate in the transverse direction is determined based on the output of the transverse light sensor array 114. A position having the highest value among the continuous section outputs higher than a predetermined threshold value can be determined as the depression coordinate in the transverse direction. At step 73, similarly, a depression coordinate in the longitudinal direction is determined based on the output of the longitudinal light sensor array 124.

Finally, at step 74, the depression coordinate in the transverse direction and the depression coordinate in the longitudinal direction are transmitted to the host computer through the communication interface 64 to end the routine.

In the depressed position-determining routine, the depression position is determined based only upon the output of the light sensor array. In order to exclude the effect of external light, however, there may be provided a sensor for measuring the quantity of external light to effect correction.

That is, the quantity of external light may be measured by using a photodiode or the like, and the depressed position may be determined based upon a difference between the quantity of external light and the quantity of transmitted light detected by the light sensor array.

In order to reliably determine the depression position, further, the output of the light sensor array may be integrated for a predetermined period, and the depression position may be determined based on a section where the integrated value has exceeded a predetermined threshold value.

In the first embodiment, the polarizing films, light sources and light sensors are arranged along the side walls of the polymer sheet 10, inevitably causing the size of the touch panel to become larger relative to the operation surface of the polymer sheet 10.

Figure 8:
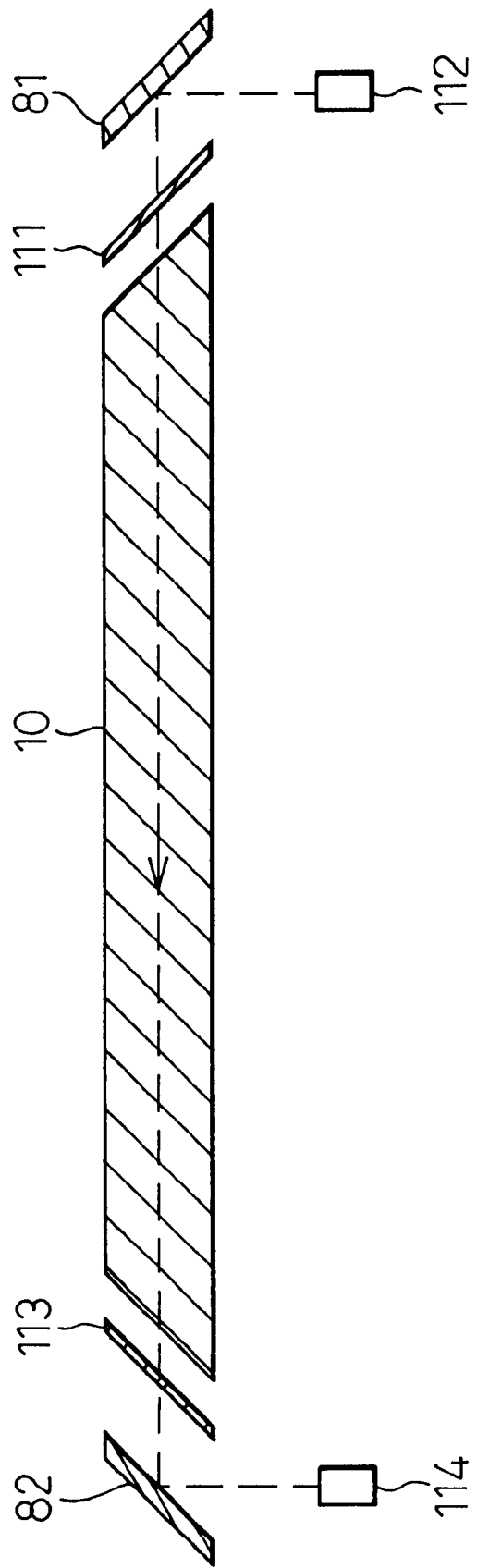
FIG. 8 is a sectional view of the touch panel according to a second embodiment of the present invention.

FIG. 8 is a sectional view of the touch panel according to a second embodiment of the present invention, which makes it possible to decrease the size of the touch panel.

That is, in the second embodiment, the pair of side walls of the polymer sheet 10 are inclined at an angle of 45 degrees in the directions opposite to each other, so that the polymer sheet 10 has a trapezoidal shape in cross section.

The polarizing films 111 and 113 are arranged along the normal planes of the polymer sheet 10 close to the normal planes, and mirrors 81 and 82 are arranged on the outer sides thereof maintaining a predetermined gap. The source of light 112 and the light sensor 114 are arranged under the polymer sheet 10.

The optical path of light emitted upwards from the source of light 112 is changed to a horizontal direction by the mirror 81, and it is polarized by the film 111 that polarizes light from the light source so as to fall on the polymer sheet 10. Light that has passed through the polymer sheet 10 passes through the film 113 that polarizes the transmitted light, and its optical path is changed to the vertical direction by the mirror 82 to fall on the optical sensor 114.

According to the second embodiment, it is possible to arrange the light source 112 and the light sensor 114 under the polymer sheet 10 and, hence, to decrease the size of the touch panel.

Figure 9:
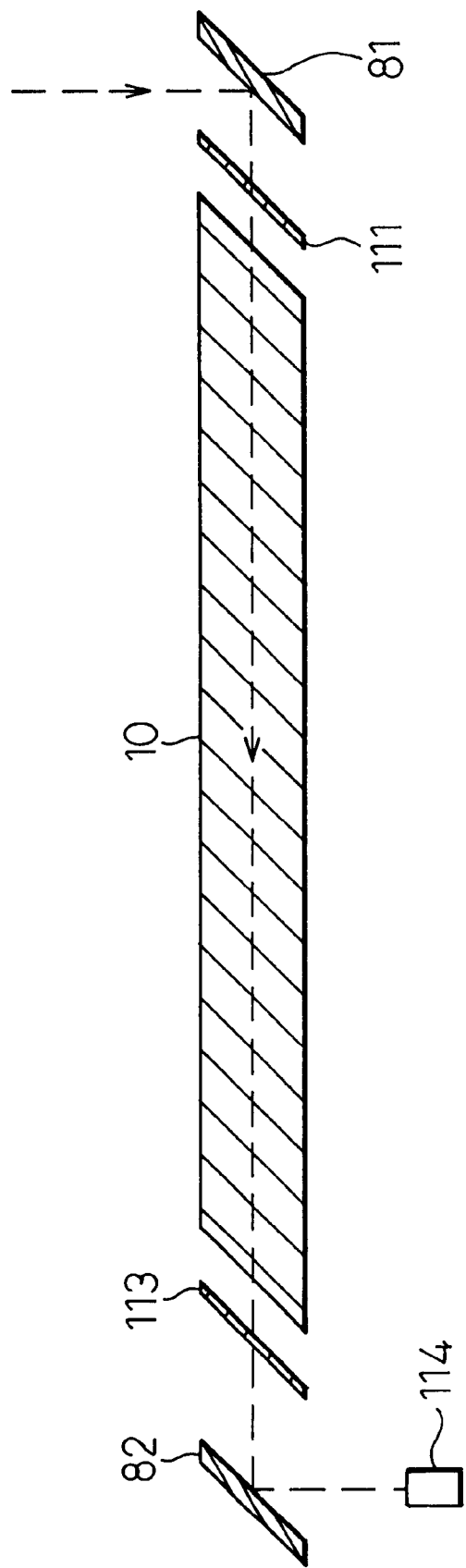
FIG. 9 is a sectional view of the touch panel according to a third embodiment of the present invention.

FIG. 9 is a sectional view of a touch panel, according to a third embodiment of the present invention, in which a pair of side surfaces of the polymer sheet 10 are cut in an inclined manner at an angle of 45 degrees in the same direction, so that the polymer sheet 10 has a rhombic shape in cross section.

When natural light is used as a light source in this embodiment, it is easy to use natural light from the upper side of the polymer sheet 10.

The foregoing embodiments have dealt with the cases where the polymer sheet 10 was directly touched. The upper surface of the polymer sheet 10 may be covered with a transparent material having an index of refraction higher than that of the polymer sheet 10 to decrease the quantity of external light falling on the polymer sheet 10.

Further, both surfaces of the polymer sheet 10 may be covered with a transparent material having an index of refraction higher than that of the polymer sheet 10, so that light emitted from the light sources goes out in decreased amounts from the polymer sheet 10 while maintaining transparency of the touch panel.

According to the touch panel of the first invention, the depression position is detected by detecting a change in the transmitted light by utilizing the fact that the amount of polarized light incident on the side wall of the polymer sheet and passing through the polymer sheet changes when the polymer is double-refracted by being depressed. This makes it possible to realize the touch panel in a simple structure yet maintaining a transparency (transmission factor of not smaller than 95%) of the touch panel.

According to the touch panel of the second invention, polarized light incident on the side wall of the polymer sheet is double-refracted as the polymer sheet is depressed. Thus, light that has passed through the polymer sheet is further polarized, and the depressed position is detected relying upon the presence of the transmitted light, making it possible to more reliably detect the depression position.

What is claimed is:
1. A touch panel comprising:
   a homogeneous polymer sheet of a shape of a flat plate in which double refraction occurs at a depressed position;
   light sources arranged along two neighboring side walls of said polymer sheet;
   first light polarizing means arranged between said polymer sheet and said light sources for polarizing light emitted from said light sources;
   second light polarizing means arranged along side walls of said polymer sheet opposite the two neighboring side walls along which said light sources are arranged for polarizing light that passed through said polymer sheet;
   light detecting means for detecting light transmitted from said light sources through said first polarizing means, said polymer sheet and said second light polarizing means; and
   depressed position specifying means for specifying the depressed position of said polymer sheet based on a result detected by said light detecting means.
2. The touch panel according to claim 1, wherein said polymer sheet has at least one inclined side wall, and provision is further made for light path-changing means for changing a path of light disposed at least between one of said light sources arranged along said inclined side wall and said polymer sheet or between said second light polarizing means and said light detecting means.
3. The touch panel according to claim 1, wherein said depressed position specifying means specifies a position where an output of said light detecting means changes due to a depression, as the depressed position.
4. The touch panel according to claim 1, wherein said polymer sheet has at least one inclined side wall, and provision is made for light path-changing means for changing a path of light disposed at least between one of said light sources arranged along said inclined side wall and said first light polarizing means for polarizing light from the light sources or between said second light polarizing means and said light detecting means.
5. The touch panel according to claim 1, wherein a direction of polarization of said first light polarizing means for polarizing light from the light sources is at right angles to a direction of polarization of said second light polarizing means, and said depressed position specifying means specifies a position where light is detected by said light detecting means at a time of depression, as the depressed position.
6. The touch panel according to claim 1, wherein said second light polarizing means polarizes the light that passed through said polymer sheet in a direction parallel with a surface of said polymer sheet.
7. The touch panel according to claim 1, further comprising external light detecting means for directly detecting external light, and wherein said depressed position specifying means specifies the depressed position based upon a difference between a detection signal of said external light detecting means and a detection signal of said light detecting means.

8. The touch panel according to claim 1, wherein said depressed position specifying means includes integration means for integrating detection values of said light detection means for a predetermined period of time, and the depressed position is specified based upon the value integrated by said integration means.

9. The touch panel according to claim 1, wherein natural light is used as said light sources.

10. The touch panel according to claim 1, wherein said light sources are at least a point source of light, light-scattering means arranged between said at least point light source and said first polarizing means for polarizing light from the light sources to scatter light from the sources of light, and grid means is arranged between said second light polarizing means and said light detecting means to permit passage of only light vertically incident upon said light detecting means.

11. The touch panel according to claim 1, wherein said polymer sheet has a high transmission factor.

12. The touch panel according to claim 1, wherein, on an upper surface of said polymer sheet, is placed a transparent material having an index of refraction larger than that of said polymer sheet.

13. The touch panel according to claim 1, wherein, on an upper surface and on a lower surface of said polymer sheet, are arranged transparent materials having an index of refraction larger than that of said polymer sheet.

14. The touch panel according to claim 1, wherein said first polarizing means and second polarizing means have a common direction of polarization, and said depressed position specifying means specifies a position where a quantity of light detected by said light detecting means changes due to a depression, as the depressed position.

15. A touch panel comprising:
a homogeneous polymer sheet of a shape of a flat plate in which double refraction occurs at a depressed position;
light sources arranged along two neighboring side walls of said polymer sheet;
a first light polarizing unit arranged between said polymer sheet and said light sources to polarize light emitted from said light sources;
a second light polarizing unit arranged along side walls of said polymer sheet opposite the two neighboring side walls along which said light sources are arranged to polarize light that passed through said polymer sheet;
a light detecting unit to detect light transmitted from said light sources through said first polarizing unit, said polymer sheet and said second light polarizing unit; and
depressed position specifying unit to specify the depressed position of said polymer sheet based on a result detected by said light detecting unit.

16. The touch panel according to claim 15, wherein said polymer sheet has at least one inclined side wall, and a light path-changing unit disposed at least between one of said light sources arranged along said inclined side wall and said polymer sheet or between said second light polarizing unit and said light detecting unit.

17. The touch panel according to claim 15, wherein said depressed position specifying unit specifies a position where an output of said light detecting unit changes due to a depression, as the depressed position.

18. The touch panel according to claim 15, wherein said depressed position specifying unit specifies a position where an output of said light detecting unit is either a maximum or a minimum, as the depressed position.

19. The touch panel according to claim 15, wherein said polymer sheet has at least one inclined side wall, and a light path-changing unit is disposed at least between one of said light sources arranged along said inclined side wall and said first light polarizing unit or between said second light polarizing unit and said light detecting unit.

20. The touch panel according to claim 15, wherein a direction of polarization of said first light polarizing unit is at right angles to a direction of polarization of said second light polarizing unit, and said depressed position specifying unit specifies a position where light is detected by said light detecting unit at a time of depression, as the depressed position.

21. The touch panel according to claim 15, wherein said second light polarizing unit polarizes the light that passed through said polymer sheet in a direction parallel with a surface of said polymer sheet.

22. The touch panel according to claim 15, further comprising external light detecting unit directly detecting external light, and wherein said depressed position specifying unit specifies the depressed position based upon a difference between a detection signal of said external light detecting unit and a detection signal of said light detecting unit.

23. The touch panel according to claim 15, wherein said depressed position specifying unit includes an integration unit integrating detection values of said light detection unit for a predetermined period of time, and the depressed position is specified based upon the value integrated by said integration unit.

24. The touch panel according to claim 15, wherein natural light is used as said light sources.

25. The touch panel according to claim 15, wherein said light sources are at least a point source of light, a light-scattering unit arranged between said at least point light source and said first polarizing unit to scatter light from the point source of light, and a grid is arranged between said second light polarizing unit and said light detecting unit to permit passage of only light vertically incident upon said light detecting unit.

26. The touch panel according to claim 15, wherein said polymer sheet has a high transmission factor.

27. The touch panel according to claim 15, wherein, on an upper surface of said polymer sheet, is placed a transparent material having an index of refraction larger than that of said polymer sheet.

28. The touch panel according to claim 15, wherein, on an upper surface and on a lower surface of said polymer sheet, are arranged transparent materials having an index of refraction larger than that of said polymer sheet.

29. The touch panel according to claim 15, wherein said first polarizing unit and second polarizing unit have a common direction of polarization, and said depressed position specifying unit specifies a position where a quantity of light detected by said light detecting unit changes due to a depression, as the depressed position.

30. A touch panel comprising:
a light source emitting light;
first polarizer polarizing the emitted light;
a homogeneous polymer sheet being depressed at a depressed position to thereby cause a depression so that the first polarized light hits the depression and thereby incurs double refraction;
a second polarizer polarizing the double refracted light; and a detector detecting the polarized, double refracted light, and determining the depressed position from the detected light.

31. The touch panel as in claim 30, wherein the light source, the first polarizer, the second polarizer, the sheet and the detector are arranged relative to each other so that, when the sheet is not depressed at said depression position, light polarized by the first polarizer is thereafter polarized by the second polarizer and then detected by the detector, without being double refracted by the sheet at said depression position.

32. The touch panel as in claim 31, wherein the first and second polarizers have polarizations relative to each other to allow the detector to detect the depressed position from the detected light.

33. The touch panel as in claim 30, wherein the first and second polarizers have polarizations relative to each other to allow the detector to detect the depressed position from the detected light.

34. A touch panel comprising:

a light source emitting light;

first and second polarizers;

a homogeneous polymer sheet being depressible; and a detector, wherein the light source, the first polarizer, the second polarizer, the sheet, and the detector are positioned relative to each other so that, when the sheet is depressed at a depressed position to thereby cause a depression, the light emitted by the light source is polarized by the first polarizer, then hits the depression and thereby incurs double refraction, the double refracted light is polarized by the second polarizer, and the polarized, double refracted light is then detected by the detector, the detector determining the depressed position from the detected light, and when the sheet is not depressed at said depression position, the light emitted by the light source is polarized by the first polarizer, then polarized by the second polarizer and then received by the detector, without being double refracted by the sheet at said depression position.

35. A touch panel comprising:

a light source emitting light;

first polarizer polarizing the emitted light;

a sheet being depressed at a depressed position to thereby cause a depression so that the first polarized light hits the depression and thereby incurs double refraction;

a second polarizer polarizing the double refracted light; and a detector detecting the polarized, double refracted light, and determining the depressed position from the detected light.

36. A touch panel comprising:

light means for emitting light;

first polarizer means for polarizing the emitted light;

double refraction means for causing the first polarized light to double refraction when a homogeneous polymer sheet is depressed at the depressed position;

second polarizer means for polarizing the double refracted light; and detector means for detecting the polarized, double refracted light, and determining the depressed position from the detected light.

* * * * *